US007350760B2

(12) United States Patent
Yamaura

(10) Patent No.: US 7,350,760 B2
(45) Date of Patent: Apr. 1, 2008

(54) CLAMP FOR CONCRETE FORMS

(75) Inventor: Hayao Yamaura, Komagane (JP)

(73) Assignee: Yamaura Corporation, Komagane (JP)

( * ) Notice: Subject to any disclaimer, the term of this patent is extended or adjusted under 35 U.S.C. 154(b) by 391 days.

(21) Appl. No.: 10/768,714

(22) Filed: Feb. 2, 2004

(65) Prior Publication Data

US 2004/0168391 A1 Sep. 2, 2004

(51) Int. Cl.
*E04G 17/02* (2006.01)
*E04G 17/04* (2006.01)
*F16B 2/10* (2006.01)

(52) U.S. Cl. ..................... 249/219.1; 249/192; 24/327; 24/517; 269/3; 269/6; 403/322.4

(58) Field of Classification Search ............. 248/316.6, 248/316.8, 340, 316.3, 316.5; 24/513, 515, 24/326, 327, 489, 498, 517; 249/219.1, 192, 249/194, 196, 44, 47; 269/3, 6, 228, 229; 403/322.4

See application file for complete search history.

(56) References Cited

U.S. PATENT DOCUMENTS

| | | | | | |
|---|---|---|---|---|---|
| 490,971 | A * | 1/1893 | Lockwood | 24/517 |
| 554,461 | A * | 2/1896 | Schrantz | 24/517 |
| 754,194 | A * | 3/1904 | Buchanan | 24/327 |
| 1,332,566 | A * | 3/1920 | Northup | 24/517 |
| 1,519,187 | A | 12/1924 | Thomas | |
| 2,490,923 | A * | 12/1949 | Sasgen | 269/143 |
| 2,641,149 | A * | 6/1953 | Petersen | 269/228 |
| 2,691,201 | A * | 10/1954 | Matthews | 285/406 |
| 3,792,829 | A * | 2/1974 | Fickett | 248/316.3 |
| 4,618,058 | A * | 10/1986 | Gregg et al. | 206/291 |
| 4,854,016 | A * | 8/1989 | Rice | 24/495 |
| 6,158,729 | A | 12/2000 | Tsai | |
| 6,767,154 | B1 * | 7/2004 | Schwoerer | 249/192 |
| 6,964,085 | B2 * | 11/2005 | Boda | 24/517 |

FOREIGN PATENT DOCUMENTS

| | | | |
|---|---|---|---|
| DE | 39 41 935 A1 | 6/1991 | |
| DE | 195 44 548 A1 | 6/1997 | |
| EP | 0 304 950 * | 3/1989 | 249/219.1 |

* cited by examiner

*Primary Examiner*—M. Safavi
(74) *Attorney, Agent, or Firm*—Venable LLP; Michael A. Sartori; Steven J. Schwarz

(57) ABSTRACT

There is provided a clamp for concrete forms which has improved durability compared with a conventional P-clamp, and can withstand vibrations necessarily produced by a vibrator when the concrete is placed. This clamp for concrete forms comprises a substantially U-shaped clamp body which rivets end parts of a pair of L-shaped clamp arms to each other so as to be rotatable and holds a connection part of the concrete forms, and a clamp lever body which presses one clamp arm toward the other clamp arm to press both clamp arms against each other by riveting ends of a pair of arm parts with respect to the other clamp arm so as to be rotatable, and rotates them toward the clamp arm, and engages an opening part formed between the pair of arm parts with the L-shaped bent shoulder part of the other clamp arm.

4 Claims, 1 Drawing Sheet

CLAMP FOR CONCRETE FORMS

BACKGROUND OF THE INVENTION

1. Field of the Invention

The present invention relates to a clamp for a concrete form to hold and fix a connection part of a wooden concrete form to be installed in advance in concrete placement work.

2. Description of the Related Art

A P-clamp utilizing a steel cam mechanism used in connecting plastic forms has been available, and the P-clamp itself is an application of a clamp used for connecting general wooden forms together.

However, such conventional P-clamps are not durable, or they are very weak against vibrations necessarily produced by a vibrator when the concrete is placed. In other words, the conventional P-clamps are not durable because they get over a stopper while a lever of the P-clamp is used, thus causing trouble in subsequent use. This occurs when the lever is turned not only by hand but also by a tool. Thus, this trouble cannot be solved in practice when many workers use the P-clamp by strictly observing the rules of use. Still worse, the stopper cannot be improved from the point of view of a cost.

Regarding the weakness against vibrations, a vibrator is operated to obtain a firm concrete periphery when the concrete is placed, and the P-clamp, which itself is assembled with a form connection part of a form, is loosened by vibrations of the vibrator. Therefore, workers must frequently re-tighten the P-clamp while checking the condition of the P-clamp, which is very troublesome in terms of work efficiency.

SUMMARY OF THE INVENTION

The present invention is achieved to solve the conventional problems described above. Accordingly, it is an object of the present invention to provide a clamp for concrete forms which improves durability compared with a conventional P-clamp, and which can withstand vibrations necessarily produced by a vibrator when the concrete is placed.

In order to solve the above problems, a clamp of the present invention comprises a substantially U-shaped clamp body 4 which stops end parts of a pair of L-shaped clamp arms 2 and 3 to each other, for example, rivets the end parts thereof so as to be rotatable, and holds a connection part P of a concrete form, and a clamp lever body 5 which presses the clamp arm 3 against the clamp arm 2 to press the clamp arms against each other by engaging an opening part 6 formed between a pair of arm parts 5A with an L-shaped bent shoulder part 7 of the clamp arm 3 by riveting the ends of the pair of arm parts 5A to the clamp arm 2 so as to be rotatable and turns them toward the clamp arm 3.

Further, the riveted part of the clamp body 4 extends in a substantially straight manner if the opening part 6 between the pair of arm parts 5A of the clamp lever body 5 is not engaged with the L-shaped bent shoulder part 7 of the clamp arm 3, while the riveted part is bent in a substantially triangular shape if the opening part is engaged therewith.

Still further, the L-shaped bent shoulder part 7 of the clamp arm 3 to be engaged with the opening part 6 between the pair of arm parts 5A of the clamp lever body 5 has a raised surface part 7A which is smoothly curved outwardly.

As described above, in the clamp for concrete forms of the present invention, the clamp lever body 5 is turned toward the clamp arm 3, the opening part 6 formed between the pair of arm parts 5A is engaged with the L-shaped bent shoulder part 7 of the clamp arm 3, and the clamp arm 3 is pressed against the clamp arm 2 to press the clamp arms against each other. Therefore, the connection part P of the concrete form is firmly held and fixed between the clamp arm 2 and the clamp arm 3.

The riveted part of the clamp body 4 extends in a substantially straight manner if the opening part 6 between the pair of arm parts 5A of the clamp lever body 5 is not engaged with the L-shaped bent shoulder part 7 of the clamp arm 3, and the clamp arms are slightly opened to the U-shape, and smoothly held and fitted to the connection part P of the concrete form by the clamp body 4.

Further, the riveted part of the clamp body 4 is bent in a substantially triangular shape if the opening part 6 between the pair of arm parts 5A of the clamp lever body 5 is engaged with the L-shaped bent shoulder part 7 of the clamp arm 3, and the clamp arms are slightly closed to the U-shape, and the clamp body 4 to hold the connection part P of the concrete form is pressed to further increase the holding force.

The raised surface part 7A which is smoothly curved outwardly prevents rotation in the loosening direction due to vibrations of the clamp lever body 5 because the clamp lever body 5 itself cannot get over the raised surface part 7A when the L-shaped bent shoulder part 7 of the clamp arm 3 is engaged with the opening part 6 between the pair of arm parts 5A of the clamp lever body 5.

DESCRIPTION OF THE PREFERRED EMBODIMENTS

Figure 1:
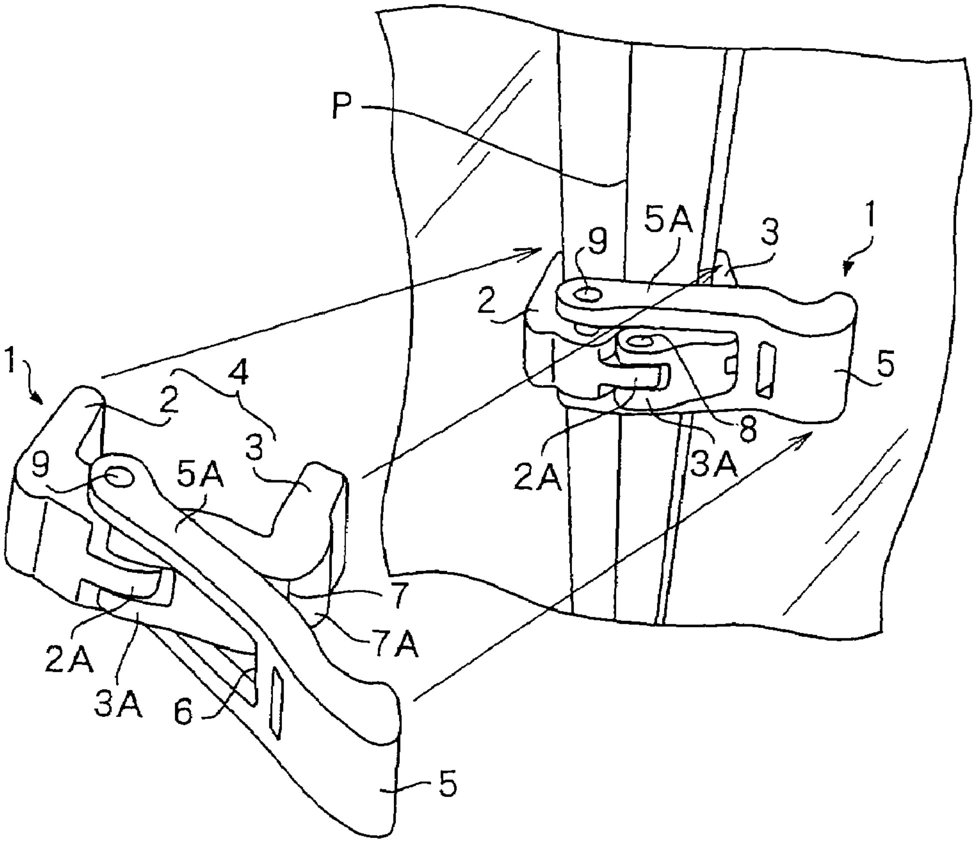
FIG. 1 is a schematic perspective view to explain clamping conditions according to an embodiment of the present invention.

Embodiments of the present invention will be described with reference to the drawings. Reference numeral 1 in the figures denotes a clamp for a concrete form which is formed of, for example, a hard synthetic resin, to firmly hold and fix a connection part P at which edge frame parts of wooden concrete form members to be installed in advance in a concrete placement work are joined with each other.

Figure 2:
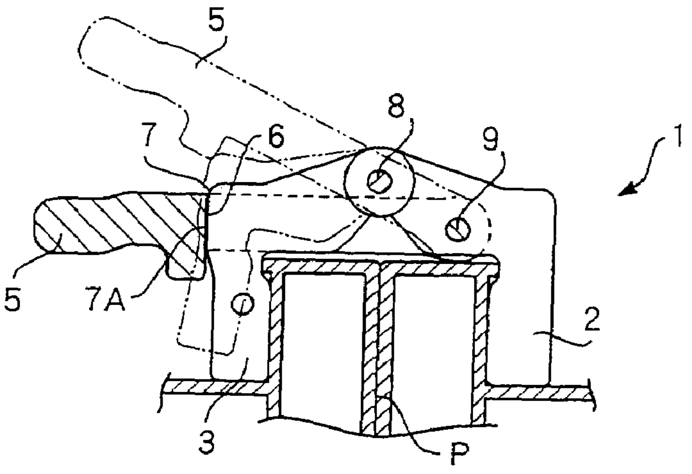
FIG. 2 is a schematic sectional view to explain clamping conditions according to an embodiment of the present invention.

As shown in FIGS. 1 and 2, this clamp 1 has a substantially U-shaped clamp body 4 which rotates to clamp end parts of a pair of L-shaped clamp arms 2 and 3 to hold a connection part P of the concrete form. In other words, one end part of one L-shaped clamp arm 2 is formed in a cylindrical male hinge part 2A narrower than the width in the vertical direction, one end part of the other L-shaped clamp arm 3 is recessed in a substantially L-shape to form a pair of mutually opposing cylindrical female hinge parts 3A with substantially the same width as the width of the male hinge part 2A, and the male hinge part 2A is fitted between the pair of cylindrical female hinge parts 3A so as to rotatably and pivotably attach the male and female hinge parts by a rivet member 8 inserted in both holes in the cylinder.

Further, ends of a pair of arm parts 5A of a clamp lever body 5 are riveted, respectively, with respect to upper and lower faces of one clamp arm 2 so as to be turnable to the clamp arm 2. In other words, in the clamp lever body 5, the arm parts 5A are disposed facing each other on the upper and lower sides via a center opening part 6 by notching the clamp lever body in a rectangular shape along the longitudinal direction from a center of one end part side of a strip-like member. Holes formed in the ends of the arm parts 5A are aligned with a hole formed through the upper and lower faces between an L-shaped bent shoulder part 7 of one clamp arm 2 and the male hinge part 2A so as to rotatably and pivotably attach the clamp body to the clamp lever body by a rivet member 9 inserted in the holes.

In this state, the length from the riveted part of the clamp lever body 5 to the distal end of the opening part 6 is set to be smaller than the sum of the length from the female hinge parts 3A (riveted parts) of the other clamp arm 3 to the L-shaped bent shoulder part 7 and the length from the male hinge part 2A (a riveted part) of one clamp arm 2 to the riveted part of the clamp lever body 5. Therefore, if the opening part 6 between the pair of arm parts 5A of the clamp lever body 5 is not engaged with the L-shaped bent shoulder part 7 of the other clamp arm 3, a riveted part of the clamp body 4 extends in a substantially straight manner. On the other hand, if the opening part is engaged therewith, the riveted part is bent in a substantially triangular shape.

As described above, by turning the clamp lever body 5 toward one clamp arm 3 to engage the opening part 6 formed between the arm parts 5A with the L-shaped bent shoulder part 7 of the clamp arm 3, the clamp arm 3 is pressed toward the other clamp arm 2 to press the clamp arms 2 and 3 against each other.

Further, a raised surface part 7A which is smoothly curved outwardly is formed on the L-shaped bent shoulder part 7 of the clamp arm 3 to be engaged with the opening part 6 between the pair of arm parts 5A of the clamp lever body 5.

Next, an example of use of the above embodiment will be described below. As shown in FIG. 1, the opening part 6 of the clamp lever body 5 of the clamp 1 is released from the L-shaped bent shoulder part 7 of the clamp arm 3 so that a riveted part of the clamp body 4 extends in a substantially straight manner. The connection part P with edge frame parts of the concrete form member joined with each other is held by the clamp body 4, and the clamp lever body 5 is pressed towards the other clamp arm 3 and turned by firmly hitting an end part of the clamp lever body 5 with a force of 500 kgW or more. Then, the opening part 6 between the pair of arm parts 5A is engaged with the L-shaped bent shoulder part 7 of the clamp arm 3. In this state, the clamp arm 3 is pressed toward the clamp arm 2 by the clamp lever body 5 to firmly press the clamp arms against each other. Thus, the holding force of the clamp 1 to the connection part P of the concrete form is increased.

In addition, the L-shaped bent shoulder part 7 of the clamp arm 3 is firmly engaged with the opening part 6 between the pair of arm parts 5A of the clamp lever body 5 by the raised surface part 7A which is smoothly curved outwardly. Therefore, the clamp lever body 5 itself cannot get over the raised surface part 7A, and rotation in the loosening direction due to vibrations of the clamp lever body 5 can be prevented. On the other hand, when the clamp 1 is detached from the connection part P of the concrete form, the clamp 1 can be easily detached if the clamp lever body 5 is disengaged from the engagement position of the L-shaped bent shoulder part 7 of the clamp arm 3.

As described above, the durability of the clamp of the present invention can be improved compared with a conventional P-clamp, and the clamp can withstand vibrations which are necessarily produced by a vibrator when the concrete is placed.

In other words, this is because the clamp of the present invention comprises the substantially U-shaped clamp body 4 which rivets the end parts of the pair of L-shaped clamp arms 2 and 3 to each other so as to be rotatable and to hold the connection part P of the concrete form, and the clamp lever body 5 which presses the clamp arm 3 against the clamp arm 2 to press the clamp arms against each other by engaging the opening part 6 formed between the pair of arm parts 5A with the L-shaped bent shoulder part 7 of the clamp arm 3 by riveting the ends of the pair of arm parts 5A to the clamp arm 2 so as to be rotatable and turning them toward the clamp arm 3. Therefore, the connection part P of the concrete form can be firmly held and fixed between the clamp arm 2 and the clamp arm 3, and is thus very strong against vibrations.

On the other hand, the riveted part of the clamp body 4 extends in a substantially straight manner if the opening part 6 between the pair of arm parts 5A of the clamp lever body 5 is not engaged with the L-shaped bent shoulder part 7 of the clamp arm 3, while the riveted part is bent in a substantially triangular shape if the opening part is engaged therewith. Thus, if the clamp arm 3 is not engaged with the L-shaped bent shoulder part 7, the clamp arms are slightly opened to form an U-shape, and are smoothly held and fitted to the connection part P of the concrete form by the clamp body 4. When the clamp arm 3 is engaged with the L-shaped bent shoulder part 7, the clamp arms are slightly closed from the U-shape, and the clamp body 4 which holds the connection part P of the concrete form is pressed to further increase the holding force.

In addition, the L-shaped bent shoulder part 7 of the clamp arm 3 to be engaged with the opening part 6 between the pair of arm parts 5A of the clamp lever body 5 has the raised surface part 7A which is smoothly curved outwardly. When the L-shaped bent shoulder part 7 of the clamp arm 3 is engaged with the opening part 6 between the pair of arm parts 5A of the clamp lever body 5, the clamp lever body 5 itself cannot get over the raised surface part 7A, and rotation in the loosening direction due to vibrations of the clamp lever body 5 can be prevented.

What is claimed is:

1. A clamp for concrete forms, comprising:

a first substantially L-shaped clamp arm having a first clamp leg with an outer shoulder cam surface, and a first joint leg extending about 90° to the first clamp leg;

a second substantially L-shaped clamp arm having a second clamp leg located opposite to the first clamp leg, and a second joint leg extending about 90° to the second clamp leg and rotatably jointed to the first joint leg; and a clamp lever body comprising third and fourth arms defining an opening, each of the third and fourth arms having an end part rotatably jointed to the second joint leg;

wherein two or more frames located between the first and second clamp legs are pressed against each other while the opening in the clamp lever body is engaged by the outer shoulder cam surface on the first clamp arm, and at least the first joint leg fits in the opening defined by the third and fourth arms.

2. The clamp for concrete forms according to claim 1, wherein the first and second joint legs are jointed by a shaft whose end is riveted so as to be rotatable, and the end parts of the third and fourth arms are jointed by a shaft whose end is riveted so that the clamp lever body is tumable with respect to the second clamp arm.

3. The clamp for concrete forms according to claim 1, wherein the first and second joint legs extend in a substantially straight manner when the opening in the clamp lever body is disengaged from the outer shoulder cam surface, and the first and second joint legs are angled with respect to one another in a substantially triangular shape when the opening is engaged with the outer shoulder cam surface.

4. The clamp for concrete forms according to claim 1, wherein the outer shoulder cam surface is located on an L-shaped bent shoulder part of the first clamp arm and comprises a raised surface part which is smoothly curved outwardly.

* * * * *